(12) United States Patent
Rajaraman et al.

(10) Patent No.: US 9,917,333 B2
(45) Date of Patent: Mar. 13, 2018

(54) LITHIUM ION BATTERY, INTEGRATED CIRCUIT AND METHOD OF MANUFACTURING A LITHIUM ION BATTERY

(71) Applicant: Infineon Technologies AG, Neubiberg (DE)

(72) Inventors: Vijaye Kumar Rajaraman, Villach (AT); Kamil Karlovsky, Bratislava (SK); Thomas Neidhart, Klagenfurt (AT); Karl Mayer, Villach (AT); Rainer Leuschner, Regensburg (DE); Christine Moser, Voelkermarkt (AT); Ravi Keshav Joshi, Villach (AT); Alexander Breymesser, Villach (AT); Bernhard Goller, Villach (AT); Francisco Javier Santos Rodriguez, Villach (AT); Peter Zorn, Villach (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 511 days.

(21) Appl. No.: 14/230,071

(22) Filed: Mar. 31, 2014

(65) Prior Publication Data

US 2015/0280288 A1    Oct. 1, 2015

(51) Int. Cl.
*H01M 14/00* (2006.01)
*H01M 10/42* (2006.01)
*H01M 2/02* (2006.01)
*H01M 2/08* (2006.01)
*H01M 10/04* (2006.01)
*H01M 2/04* (2006.01)
*H01M 2/06* (2006.01)
(Continued)

(52) U.S. Cl.
CPC ..... *H01M 10/4257* (2013.01); *H01M 2/0202* (2013.01); *H01M 2/024* (2013.01);
(Continued)

(58) Field of Classification Search
CPC ........... H01M 10/4257; H01M 10/425; H01M 10/04; H01M 10/049; H01M 10/0525;
(Continued)

(56) References Cited

U.S. PATENT DOCUMENTS 4,859,263 A   8/1989  Dziurla et al.
5,864,182 A   1/1999  Matsuzaki
(Continued)

FOREIGN PATENT DOCUMENTS

CN    1853297 A    10/2006
CN    1860568 A    11/2006
(Continued)

OTHER PUBLICATIONS

Hahn, R et al, "Silicon Integrated Micro Batteries Based on Deep Reactive Ion Etching and Through Silicon via Technologies," IEEE 2012, pp. 1571-1577.

*Primary Examiner* — Raymond Alejandro
(74) *Attorney, Agent, or Firm* — Murphy, Bilak & Homiller, PLLC

(57) ABSTRACT

A lithium ion battery includes a first substrate having a first main surface, and a lid including an insulating material. The lid is attached to the first main surface of the first substrate, and a cavity is defined between the first substrate and the lid. The lithium ion battery further includes an electrical interconnection element in the lid, the electrical interconnection element providing an electrical connection between a first main surface and a second main surface of the lid. The lithium ion battery further includes an electrolyte in the cavity, an anode at the first substrate, the anode including a component made of a semiconductor material, and a cathode at the lid.

20 Claims, 11 Drawing Sheets

(51) Int. Cl.
*H01M 10/052* (2010.01)
*H01M 6/40* (2006.01)

(52) U.S. Cl.
CPC .......... *H01M 2/0404* (2013.01); *H01M 2/06* (2013.01); *H01M 2/08* (2013.01); *H01M 6/40* (2013.01); *H01M 10/04* (2013.01); *H01M 10/0436* (2013.01); *H01M 10/052* (2013.01); *Y10T 29/4911* (2015.01)

(58) Field of Classification Search
CPC ............ H01M 10/052; H01M 10/058; H01M 2/0202; H01M 2/024; H01M 2/08; H01M 2/0404
See application file for complete search history.

(56) References Cited

U.S. PATENT DOCUMENTS

| | | |
|---|---|---|
| 6,251,540 B1 | 6/2001 | Kejha |
| 6,333,565 B1 | 12/2001 | Hashimoto |
| 2003/0152815 A1 | 8/2003 | LaFollette et al. |
| 2004/0131925 A1 | 7/2004 | Jenson et al. |
| 2006/0113652 A1 | 6/2006 | Mino et al. |
| 2007/0275300 A1* | 11/2007 | Salot ................ H01G 9/016 429/163 |
| 2008/0050656 A1 | 2/2008 | Eisenbeiser et al. |
| 2011/0183186 A1 | 7/2011 | Klootwijk et al. |
| 2012/0007749 A1 | 1/2012 | Oldknow et al. |
| 2012/0021280 A1* | 1/2012 | Katase ................ H01G 11/22 429/211 |
| 2012/0034541 A1 | 2/2012 | Muraoka et al. |
| 2013/0183575 A1 | 7/2013 | Goto et al. |
| 2014/0212735 A1 | 7/2014 | Li et al. |

FOREIGN PATENT DOCUMENTS

| | | |
|---|---|---|
| CN | 101471186 A | 7/2009 |
| CN | 101771168 A | 7/2010 |
| CN | 102598365 A | 7/2012 |
| WO | 2004051768 A1 | 6/2004 |

* cited by examiner

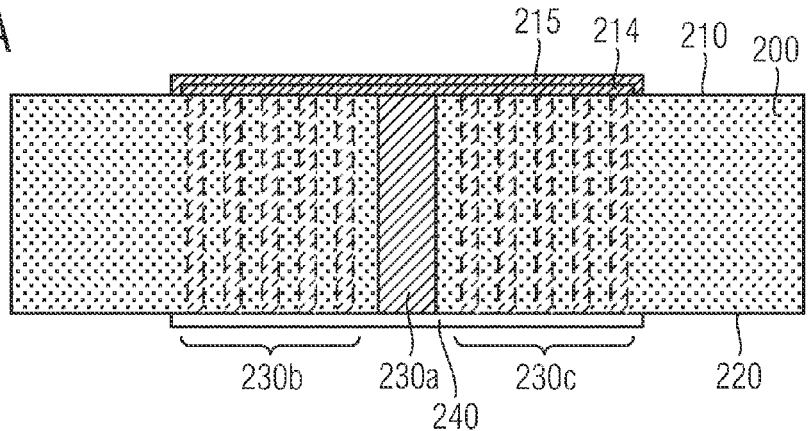
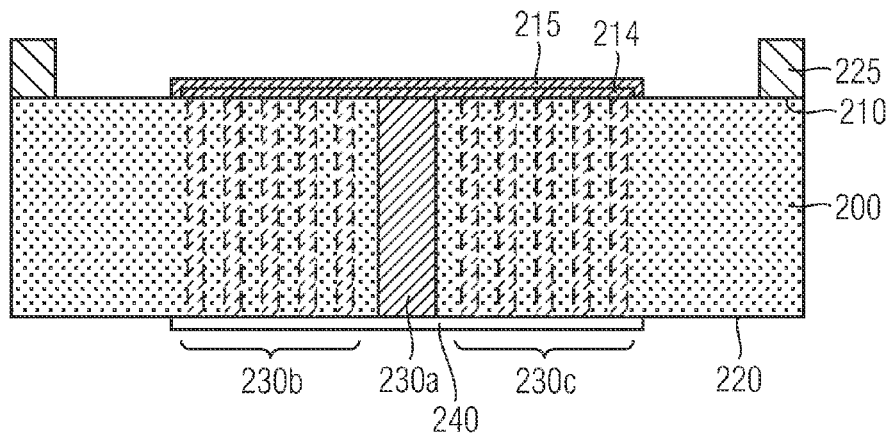
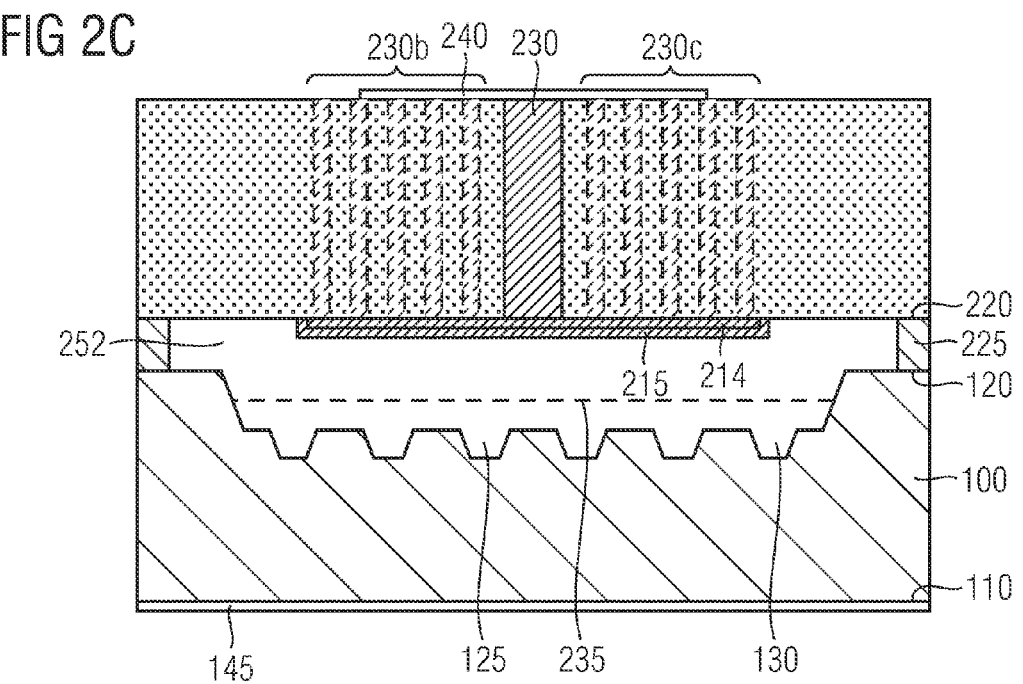

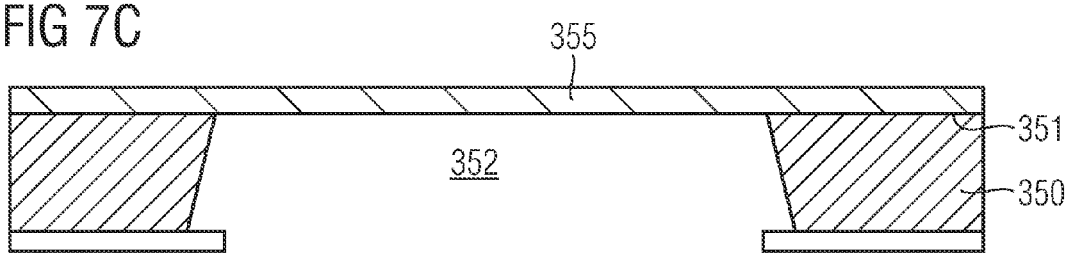
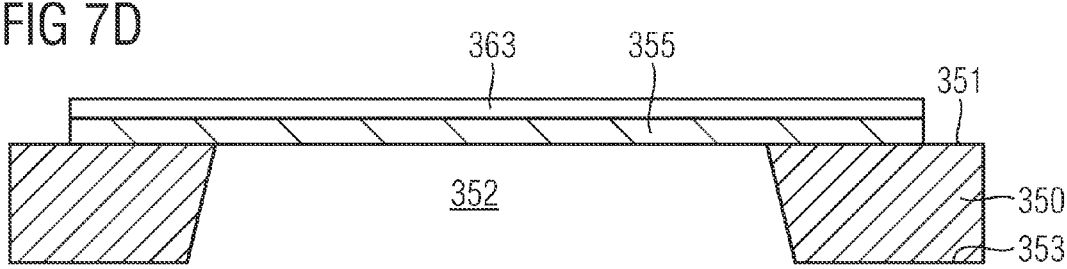
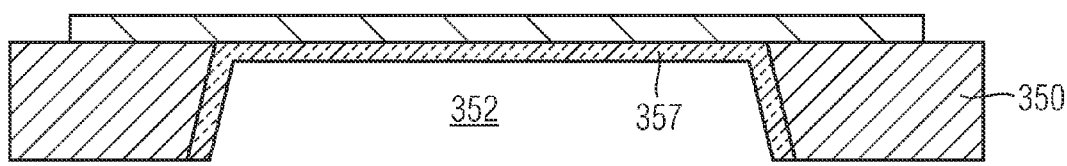
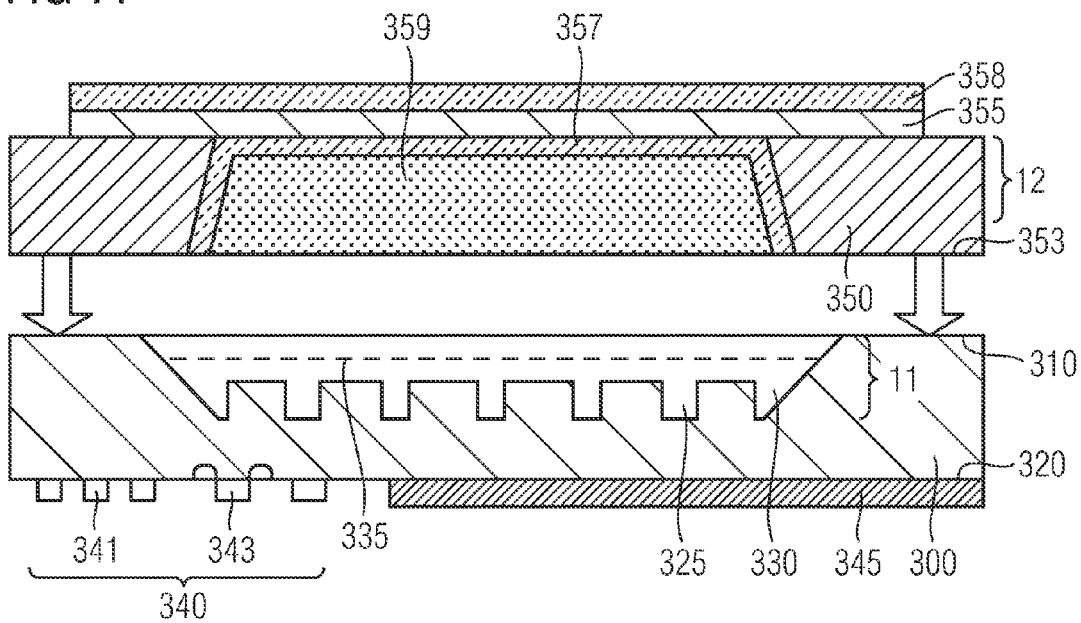

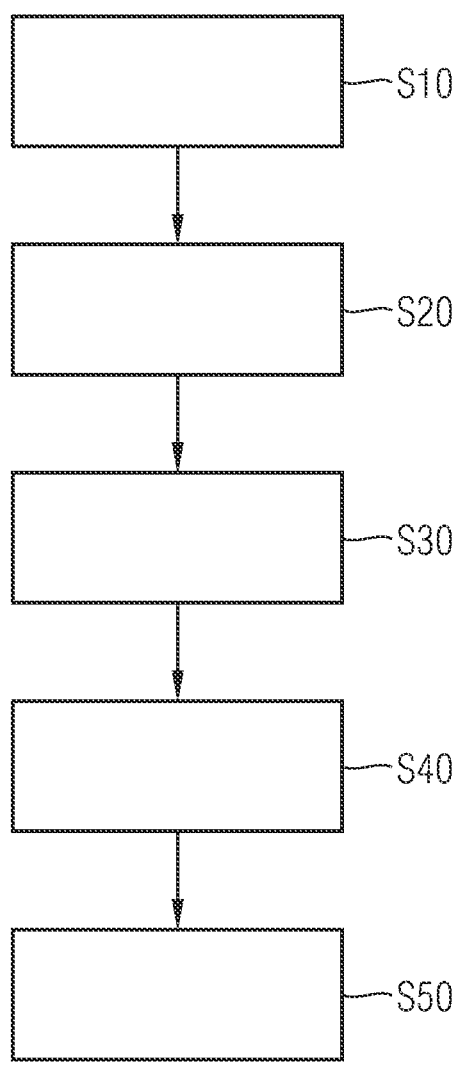

LITHIUM ION BATTERY, INTEGRATED CIRCUIT AND METHOD OF MANUFACTURING A LITHIUM ION BATTERY

BACKGROUND

With the increased use of portable electronic devices such as notebooks, portable telephones, cameras and others and with the increased use of current-driven automobiles, lithium ion secondary batteries with high energy density have attracted increasing attention as a power source.

Further, attempts are being made for providing semiconductor devices or semiconductor-based devices having an integrated power source.

Lithium ion secondary batteries typically include a cathode comprising a lithium-containing transition metal oxide or the like, an anode typically made of a carbon material and a non-aqueous electrolyte containing a lithium salt as well as a separator situated between the anode and the cathode.

In order to meet the increasing demands on capacity and performance, new concepts for lithium batteries that can be manufactured in a simple manner are desirable.

SUMMARY

According to an embodiment, a lithium ion battery comprises a first substrate having a first main surface and a lid comprising an insulating material. The lid is attached to the first main surface of the first substrate, and a cavity is defined between the first substrate and the lid. The lithium ion battery further comprises an electrical interconnection element in the lid, the electrical interconnection element providing an electrical connection between a first main surface and a second main surface of the lid. Additionally, the lithium ion battery comprises an electrolyte in the cavity, an anode at the first substrate, the anode comprising a component made of a semiconductor material, and a cathode at the lid.

According to a further embodiment, an integrated circuit comprises a lithium ion battery and integrated circuit elements. The lithium ion battery includes a first substrate having a first main surface, a lid comprising an insulating material, the lid being attached to the first main surface of the first substrate, and a cavity is defined between the first substrate and the lid. The lithium ion battery further comprises an electrical interconnection element in the lid, the electrical interconnection element providing an electrical connection between a first main surface and a second main surface of the lid. The lithium ion battery further comprises an electrolyte in the cavity, an anode at the first substrate, the anode comprising a component made of a semiconductor material, and a cathode at the lid.

According to an embodiment, a method of manufacturing a lithium ion battery comprises forming an electrical interconnection element in a lid comprising an insulating material, the electrical interconnection element providing an electrical connection between a first main surface and a second main surface of the lid. The method further comprises forming a cathode at the lid, forming an anode at a first main surface of a first substrate, the anode comprising component made of a semiconductor material. Forming the cathode or forming the anode comprises defining a cavity. The method further comprises filling an electrolyte into the cavity, and attaching the lid to the first main surface of the first substrate.

Those skilled in the art will recognize additional features and advantages upon reading the following detailed description, and upon viewing the accompanying drawings.

BRIEF DESCRIPTION OF THE DRAWINGS

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

FIGS. 2A to 2C illustrate elements of a method of manufacturing a battery according to an embodiment;

FIGS. 7A to 7F illustrate method of manufacturing a battery according to a further embodiment; and FIG. 8 illustrates a general method of manufacturing a battery.

DETAILED DESCRIPTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. It is to be understood that other embodiments may be utilized and structural or logical changes may be made without departing from the scope defined by the claims.

The description of the embodiments is not limiting. In particular, elements of the embodiments described hereinafter may be combined with elements of different embodiments.

The terms "wafer", "substrate" or "semiconductor substrate" used in the following description may include any semiconductor-based structure that has a semiconductor surface. Wafer and structure are to be understood to include silicon, silicon-on-insulator (SOI), silicon-on sapphire (SOS), doped and undoped semiconductors, epitaxial layers of silicon supported by a base semiconductor foundation, and other semiconductor structures. The semiconductor need not be silicon-based. The semiconductor could as well be silicon-germanium, germanium, or gallium arsenide. According to other embodiments, silicon carbide (SiC) or gallium nitride (GaN) may form the semiconductor substrate material.

As employed in this specification, the terms "coupled" and/or "electrically coupled" are not meant to mean that the elements must be directly coupled together—intervening elements may be provided between the "coupled" or "electrically coupled" elements. The term "electrically connected" intends to describe a low-ohmic electric connection between the elements electrically connected together.

The terms "lateral" and "horizontal" as used in this specification intends to describe an orientation parallel to a first surface of a semiconductor substrate or semiconductor body. This can be for instance the surface of a wafer or a die.

The term "vertical" as used in this specification intends to describe an orientation which is arranged perpendicular to the first surface of the semiconductor substrate or semiconductor body.

Figure 1:
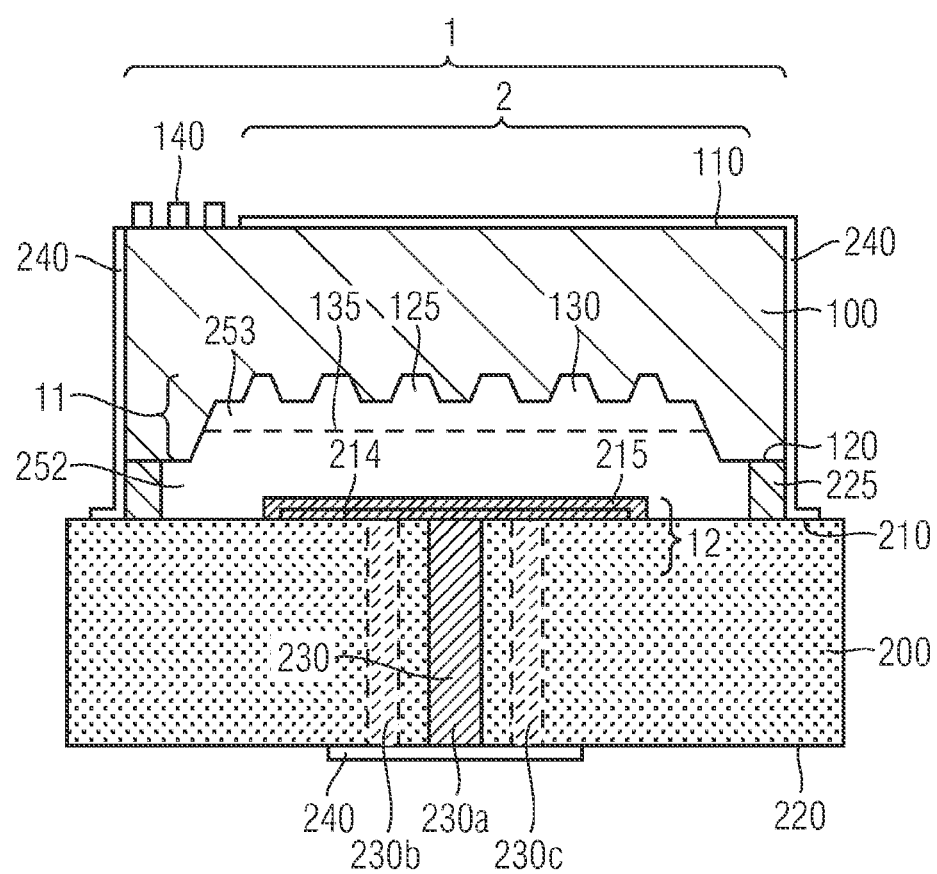
FIG. 1 illustrates a cross-sectional view of an integrated circuit including a battery according to an embodiment.

FIG. 1 shows as a cross-sectional view of an integrated circuit 1 according to an embodiment. The integrated circuit 1 comprises a battery 2 and integrated circuit elements 140. The lithium ion battery 2 shown in FIG. 1 comprises an anode 11, a cathode 12, an electrolyte 130 and a housing comprising a first substrate 100, a lid 200 and a bonding member 225.

The anode 11 comprises a semiconductor material. For example, the anode 11 may comprise silicon material which may be monocrystalline, polycrystalline or amorphous. The silicon material may be doped with any dopant as is conventionally used such as boron (B), arsenic (As), phosphorous (P), antimony (Sb), gallium (Ga), indium (In) or selenium (Se). The active silicon surface of the anode 11 may be planar or patterned. For example, three-dimensional structures such as trenches, pyramids and columns may be formed in the surface of the anode. A thin metal layer (not shown) may be formed over the surface of the anode 11, the thin metal layer contacting the electrolyte 130. For example, the metal layer may comprise silver (Ag), aluminium (Al), gold (Au), palladium (Pd) or platinum (Pt). Metals forming an alloy with lithium may be used. Further examples comprise Zn, Cd, B, Ga, In, Th, C, Si, Ge, Sn, Pd, As, Sb, Bi, Se, and Te. A thickness of the metal layer may be less than 100 nm and more than 1 nm. Therefore, when applying an Ag-metal layer, an Ag—Li alloy will be formed at the surface of the anode 11 before charging the Si material with lithium so that the Li ions will move to the Si anode in a homogeneous manner. Further, due to the alloy layer, the formation of the native $SiO_2$ layer on the anode surface is prevented so that the transportation of ions is further enhanced. In addition, the incorporation of Li atoms in the Si anode will be accomplished in a more homogeneous manner so that the performance of a lithium ion battery will be improved. Due to the presence of the thin metal layer, the mechanical stability of the electrode during charging and discharging is enhanced. As is to be clearly understood, the anode may be made of silicon without the presence of the thin metal layer.

The cathode 12 may comprise one or more cathode materials 215 As a cathode material 215, generally known materials that are used in lithium ion batteries, such as $LiCoO_2$, $LiNiO_2$, $LiNi_{1-x}Co_xO_2$, $Li(NiO_{0.85}Co_{0.1}Al_{0.05})O_2$, $Li(Ni_{0.33}Co_{0.33}Mn_{0.33})O_2$, $LiMn_2O_4$ spinel and $LiFePO_4$ may be used. The materials forming the cathode may be implemented as a layer formed over a suitable substrate or an insulating carrier.

The electrolyte 130 may include electrolytes commonly used for lithium batteries such as e.g. $LiPF_6$, $LiBF_4$ or salts which do not include fluorine such as $LiPCl_6$, $LiCl_4$ in water-free aprotic solvents such as propylene carbonate, dimethyl carbonate or 1,2-dimethoxymethane, ethylene carbonate, diethyl carbonate and others, polymers, for example polyvinylidene fluoride (PVDF) or other polymers, solid electrolytes such as $Li_3PO_4N$ and others. For example, liquid electrolytes may be used, for example, electrolytes that do not withstand high temperatures that are higher than 80° C. As is to be clearly understood, also solid or liquid electrolytes that withstand temperatures higher than 80° C. may be used. As will become apparent from the following description, if fluorine-free salts and fluorine-free solvents are used as electrolytes, problems may be avoided when the housing of the lithium ion battery includes components made of glass.

The separator element 135 spatially and electrically separates the anode 11 and the cathode 12 from each other.

The separator element 135 should be permeable for the ions so that a conversion of the stored chemical energy into electrical energy may be accomplished. Examples of the material of the separator element 135 comprise non-woven fabric made of materials such as fiber glass, polyethylene or microporous materials. Further, membranes which are made of microporous sheet that may comprise several layers may be employed. Further examples comprise non-woven fabric which is coated with a ceramic material. As is to be clearly understood, the separator element 135 may be dispensed with.

The battery 2 may be a rechargeable or secondary lithium ion battery. According to a further embodiment, the battery may be a primary battery which is not rechargeable. The battery 2 shown in FIG. 1 has an improved capacity for energy storage, since silicon has a large capacity of insertion of lithium. In other words, the amount of lithium atoms that can be stored or inserted in silicon is much larger than in conventional cases. Since—as will be discussed in the following—the first substrate may comprise a semiconductor material, general semiconductor processing methods may be employed. In particular, methods for manufacturing miniaturized sizes can effectively be applied for manufacturing a battery having a small size in comparison to conventional batteries. Further, components of integrated circuits may be easily integrated with the battery 2.

The battery 2 shown in FIG. 1 comprises a first substrate 100 having a first main surface 120. The battery further comprises a lid 200 comprising an insulating material. The lid 200 is attached to the first main surface 120 of the first substrate 100. A cavity 252 is defined between the first substrate 100 and the lid 200. The battery further comprises an electrical interconnection element 230 in the lid 200. The electrical interconnection element 230 provides an electrical connection between a first main surface 210 and a second main surface 220 of the lid 200. The battery further comprises an electrolyte disposed in the cavity 252. The anode of the battery 11 is formed at the first substrate 100 and the cathode 200 is formed at the lid 200. For example, the cavity 252 may comprise a recess 253 that is formed in the lid.

For example, the electrical interconnection element may be implemented by one or more via holes that are disposed in the lid 200. For example, the via hole may extend from the first main surface 210 to the second main surface 220 of the lid 200. The via hole may be filled with a conductive material, for example, a metal, e.g. tungsten, or a semiconductor material such as polysilicon. According to a further embodiment, any kind of conductive structure may be embedded in the lid 200. For example, a portion of a further substrate which may be made of a conductive material or a semiconductor material may be embedded in the lid. Due to the feature that the electrical interconnection element is disposed in the lid or forms part of the lid, a vertical electrical contact can be implemented in an easy and compact manner.

As is shown in FIG. 1, the electrical interconnection element 230 comprises a central via hole 230a and further via holes 230b, 230c that are disposed on opposite sides of the central via hole 230a. Further, in a plane before and behind the depicted plane of the drawing, a plurality of via holes may be present. The electrical interconnection element 230 is disposed at a position so as to ensure that the cathode 12 is electrically insulated from the anode 11. Due to the presence of the electrical interconnection element, electrical contacts to the battery can be easily achieved. For example, the electrical interconnection element may be formed by etching via holes in the lid, followed by methods such as screen printing or inkjet printing. According to further embodiments, the electrical interconnection element may be formed by embossing a conductive material into glass, e.g. using a semiconductor embossing or metal embossing method. According to further embodiments, the electrical interconnection element may be formed by performing a reflow process of glass onto a conducting material. Thereby, the vertical interconnection of the battery may be provided. According to a further modification, the lid may be of a conductive or a semiconductor material. In this case, the electrical interconnection element may be insulated from the lid, e.g. using an appropriate insulating material.

The lid 200 is attached to the first substrate by means of bonding members 225. These bonding members 225 which may be implemented by a UV curable or thermally curable glue provide a sealing of the battery. Generally, the reliability of this sealing may be increased by increasing the width of the bonding member 225 in a direction parallel to the first main surface 120 of the substrate 100, for example. The integrated circuit shown in FIG. 1 further comprises a thin-film overcoat 240 that may be insulating or conductive and which seals a connection portion between the first substrate 100 and the lid 200. For example, the thin-film overcoat may be made of or comprise Al, Cu, Ni or a dielectric layer. The thickness of the thin-film overcoat depends from the material. For example, the thin-film overcoat may have a thickness of 10 to 500 nm. According to further implementations, the thin-film overcoat may comprise a sealing tape or another suitable polymer. Due to the presence of the thin-film overcoat 240, the reliability of the sealing of the connection portion may be increased without increasing the width of the bonding member 225, resulting in a reduced size of the battery. Further, a UV curable or thermally curable glue having inferior sealing properties may be employed, when a thin-film overcoat 240 is formed over the battery, while ensuring the required sealing property.

Components 140 of the integrated circuit such as conductive lines, transistors, resistors, switches and others may be disposed adjacent to the second main surface 110 of the substrate 100. According to further implementations, these components may be disposed at arbitrary positions. Thus, an integrated circuit 1 may comprise the battery and components 140 of an integrated circuit.

A method of manufacturing the battery shown in FIG. 1 will be explained in the following while referring to FIGS. 2A to 2C.

Electrical interconnection elements 230a, b, c are formed in a carrier so as to form a lid 200. The carrier may be made of an insulating material such as glass or polymer which may be transparent to UV light. Nevertheless, the carrier may be made of any other suitable material.

For example, forming the electrical interconnection elements may be accomplished by forming via holes in the carrier, e.g. by etching, and filling the via holes with a conductive material. For example, this may be accomplished using screen printing, inkjet printing, a CVD ("chemical vapour deposition") method, electroplating, electroless plating or any other suitable method known from semiconductor processing. According to a further implementation, a conducting material that may be made of a metal or a semiconductor material may be embossed into glass. According to this method, the conductive elements are pressed into the carrier which is held at a temperature above the glass transition point so that the conducting elements may be incorporated in the carrier. According to a further implementation, the carrier material may be reflown onto a conducting material.

Then, for forming the cathode 12, a portion of a cathode material layer 215 is formed on the first main surface 210 of the carrier comprising an insulating material. The cathode material layer 215 is made of a material that is suitable for forming a cathode of a battery. Examples of the metal comprise any of the materials mentioned above. The cathode material layer 215 is patterned using commonly known techniques such as photolithographic methods and others. For example, the thickness of the cathode material layer 215 may be 100 to 300 µm. According to a further implementation, the cathode 12 may be formed by applying a conductive paste or by inkjet printing. According to an embodiment, a thin conductive or metal layer 214 may be formed between the cathode material layer 215 and the electrical interconnection element 230. For example, this thin conductive or metal layer 214 may be formed by commonly used processes. The metal layer 214 may have a thickness of 100 to 1000 nm. The carrier may form the lid 200 of the processed battery or integrated circuit.

Thereafter, a back side metallization 240 is formed on the second main surface 220 of the lid 200. FIG. 2A shows an example of a resulting structure.

Bonding members 225 are bonded on the first main surface 210 of the lid 200. For example, the bonding member 225 may comprise a UV-curable glue or thermally curable glue, for example, a polymer that may be cured at elevated temperatures such as 60° C. For example, the bonding member 225 may be formed using a lithographic method, an inkjet printing or screen printing method, or by dispensing. According to an implementation, a thermally curable glue may be applied by a lithographic method. Further, inkjet printing or screen printing may be used for applying a UV-curable glue or a thermally curable glue. According to a further implementation, the bonding member 225 may be made of a polymer adhesive. FIG. 2B shows an example of a resulting structure.

A first substrate 100 that may be made of a semiconductor material such as silicon is processed to form a cavity 252. Moreover, the first main surface 120 of the semiconductor substrate is patterned to form grooves 125. The liquid electrolyte 130 is filled into the cavity 252. Further, a separator element 235 is disposed within the cavity 252. According to embodiments, a solid electrolyte may be employed. Further, the separator element 235 may be dispensed with. Then, a curing process is performed, for example, using UV light or by using a thermal process. As a result, the battery shown in FIG. 2C may be formed.

Figure 2D:
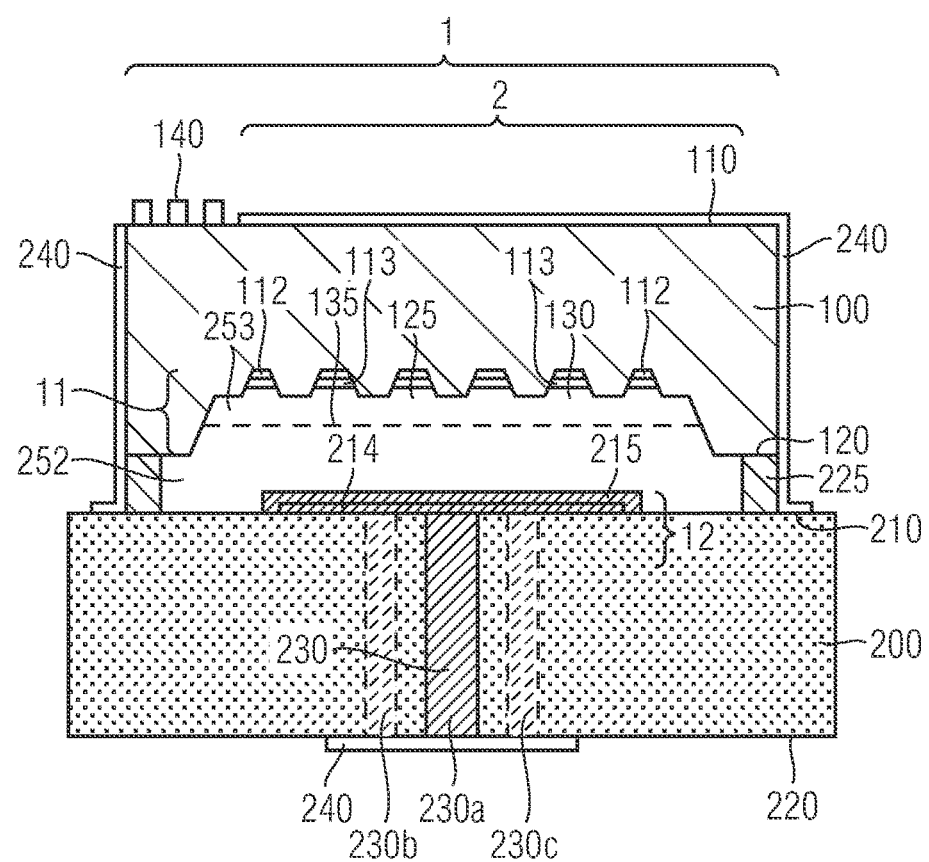
FIGS. 2D and 2E illustrate general modifications of the battery.
Figure 2E:
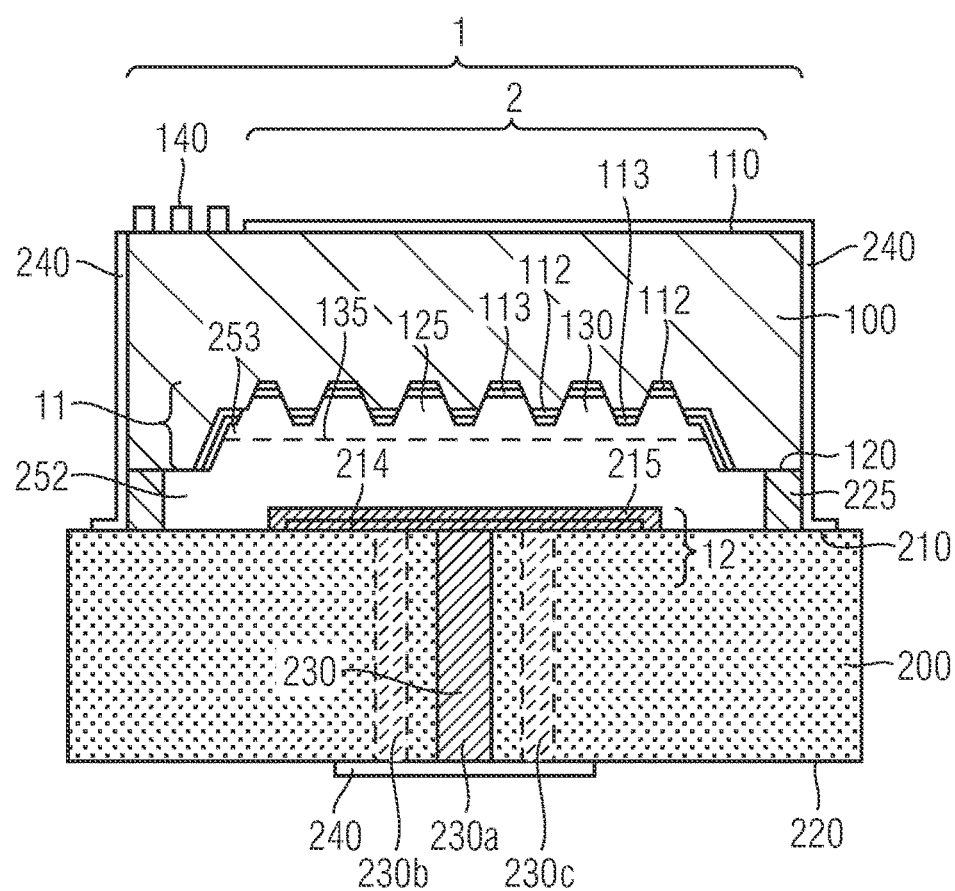

FIG. 2D shows a modification of the structure shown in FIG. 2C. As is shown, the lithium ion battery may further comprise a barrier layer (stack) that may be formed over portions of the anode. For example, the barrier layer may comprise a metal layer 112 such as TiW. Optionally, the barrier layer stack may further comprise an oxide layer 113 such as silicon oxide. For example, such an oxide layer may be formed by a PECVD (plasma enhanced chemical vapour deposition) method. The barrier layer (stack) may prevent the diffusion of lithium into the silicon at certain positions. The barrier layer (stack) may comprise a metallic layer alone or in combination with another metallic or oxide layer. As is illustrated in FIG. 2D, the barrier layer (stack) may be disposed in the trenches 125. According to the modification shown in FIG. 2E, the barrier layer (stack) may be disposed in the trenches 125 and in the silicon pillars between adjacent trenches 125. Differently stated, according to the modification shown in FIG. 2E, the barrier layer (stack) is disposed over horizontal portions of the anode 11. As is to be clearly understood, the barrier layer (stack) may be combined with any of the embodiments described herein.

According to an implementation, the battery or the integrated circuit may further comprise a thin-film overcoat that may be made of a conductive or an insulating material. For example, this thin-film overcoat may be formed using commonly known methods. According to an implementation, when a non-hermetic adhesive material like a sealing tape is used as a bonding member 225, such a thin-film overcoat 240 provides a hermetic sealing around the bonding member 225. The thin-film overcoat 240 also provides a hermetic sealing around the bonding member if an adhesive material like UV-curable glue or thermally curable glue is employed.

Figure 3A:
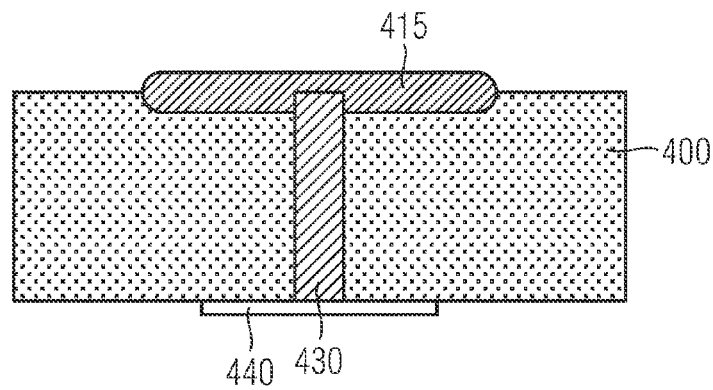
FIGS. 3A to 3C illustrate steps of a method of manufacturing a battery according to an embodiment.
Figure 3B:
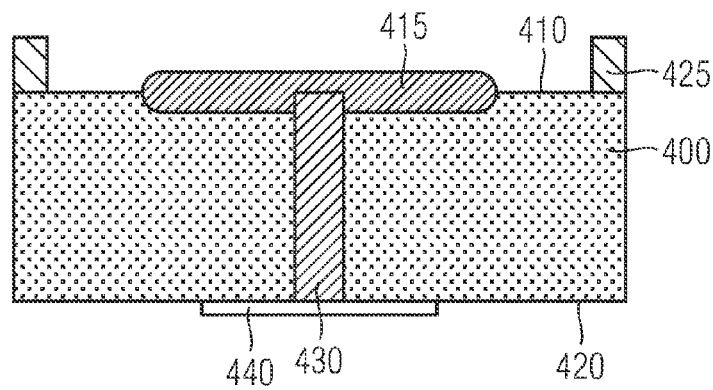
Figure 3C:
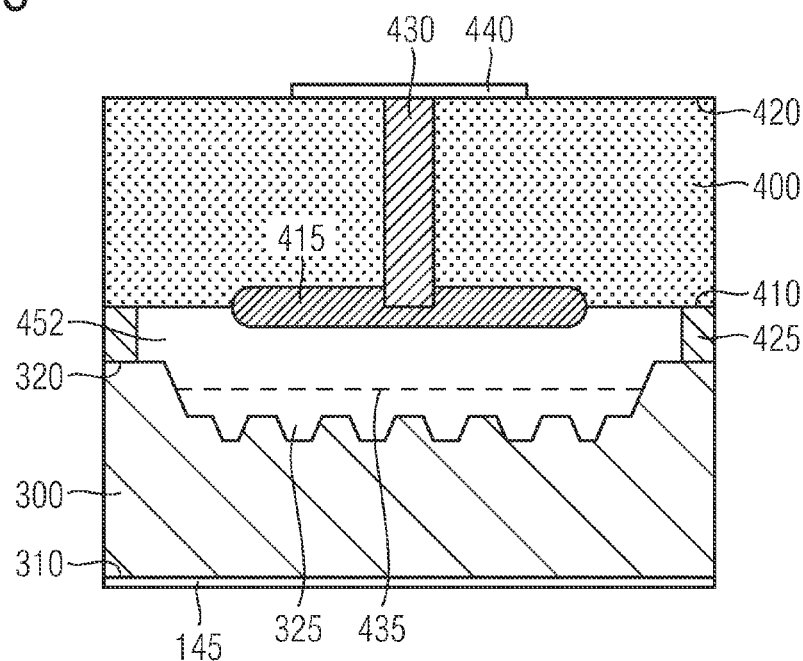

FIGS. 3A to 3C illustrate a further method of manufacturing the integrated circuit shown in FIG. 1. An insulating carrier 400 may be processed in a similar manner as has been described with reference to FIG. 2A to provide one or more electrical connection elements 430. Then, a portion of the first main surface 410 of the carrier is etched to form a recess. Further, a deposition process is performed so as to form the cathode layer 415 in the etched region. For example, the cathode layer 415 may be formed by depositing a metal layer or by screen printing a metal layer, for example. According to an alternative implementation, the cathode layer 415 may be bonded to the insulating carrier 400 using a hot embossing method.

The further elements such as back side metallization 440 and bonding members 425 are formed in a similar manner as has been described with reference to FIG. 2B. FIG. 3B shows an example of a resulting structure.

Then, the first substrate 300 is processed in a similar manner as has been described with reference to FIG. 2C. The lid is attached to the first substrate 300 in a similar manner has as been described above with reference to FIG. 2C. FIG. 3C shows an example of a resulting structure. As is shown, the cathode layer 415 is partially buried within the lid 400. Thereby, a more compact battery may be formed. Further, a cavity 452 is defined between the first substrate 300 and the lid 400. As is to be clearly understood, the battery according to the embodiment may also comprise the thin conductive or metal layer 214 which is illustrated in FIGS. 2A to 2C.

Figure 4:
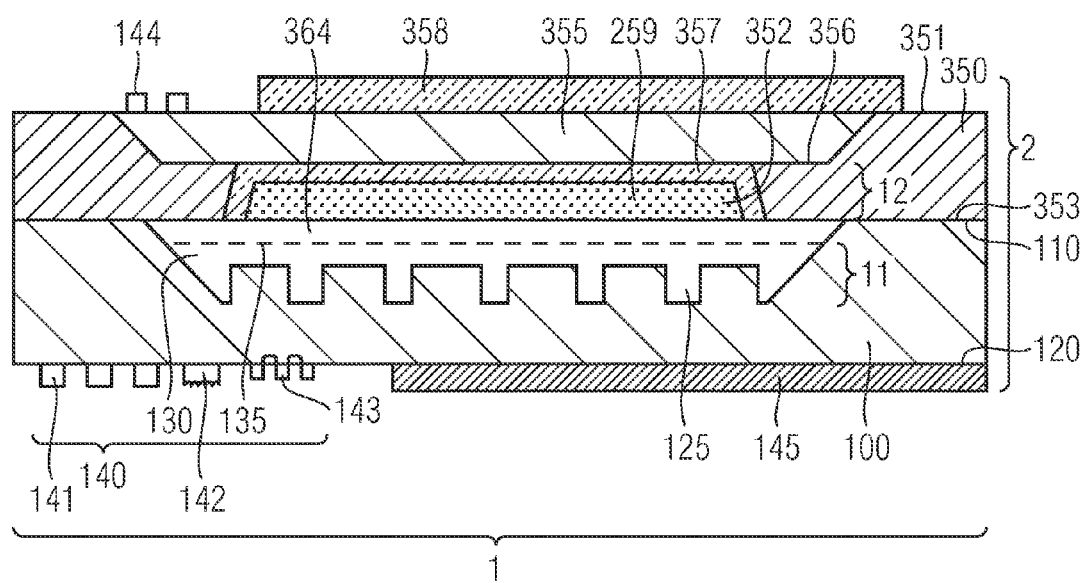
FIG. 4 shows a cross-sectional view of an integrated circuit including a battery according to a further embodiment.

FIG. 4 shows a further embodiment according to which the electrical interconnection element is a portion of a second substrate 355 that is embedded into a carrier 350. The battery 2 shown in FIG. 4 comprises a first substrate 100 having a first main surface 120 and second main surface 110.

A depression is formed in the first main surface 120, followed by a patterned structure 125, including trenches, for example. The first substrate 100 may comprise semiconductor material. A second substrate 355 is bonded to a carrier 350. A recess 352 is formed in the second surface of the carrier 350 to uncover a portion of the second main surface of the second substrate 355. The second main surface 353 of the carrier 350 is attached to the first main surface 120 of the first substrate 100. Thereby, a cavity 364 is formed between the first substrate 100 comprising the depression, the carrier 350 including the recess 352 and the second substrate 355 that is bonded to the carrier 350.

The carrier 350 may be made of an insulating material such as glass. The second substrate 355 may comprise a conducting or semiconductor material. According to the embodiment shown in FIG. 4, the carrier 350 implements the lid comprising an insulating material. Further, the second substrate 355 implements the electrical interconnection element. In the embodiment illustrated in FIG. 4, integrated circuit elements 140, 144 may be disposed adjacent to the second main surface 110 of the first semiconductor substrate 100 or at the first main surface 351 of the second substrate 355. The first substrate 100 may be implemented as has been described above with reference to FIG. 1. The battery 2 of FIG. 4 further comprises a protective conductive layer 357 lining the recess 352 formed in the layer stack comprising the carrier 350 and second substrate 355. The protective layer 357 prevents a contact between the cathode material 259 and the material of the second substrate 355.

The cathode 12 of the battery 2 is implemented by NCA (nickel cobalt aluminum oxide with intercalated lithium) or any other suitable cathode material.

In the following, a method of manufacturing such a battery will be explained while referring to FIGS. 5A to 5F. A first substrate 100 which may comprise a semiconductor material is prepared so as to establish an anode of a lithium ion battery. In particular, a depression is formed, followed by trenches 125 so as to form a patterned surface. A back side metallization (element) 145 may be formed on the second main surface 110 of the first substrate.

Figure 5A:
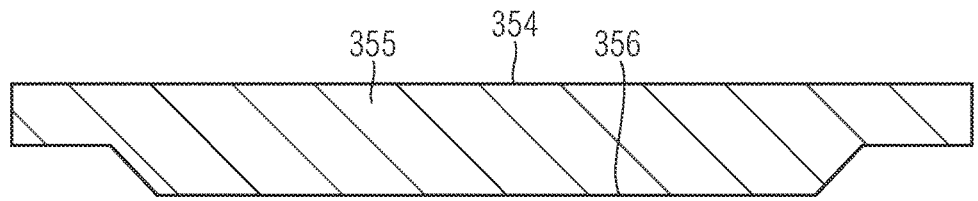
FIGS. 5A to 5F illustrate steps of manufacturing a battery according to an embodiment.

A second main surface 356 of a second substrate 355 which may comprise a conductive material such as a metal or an arbitrary semiconductor material, such as silicon is patterned so as to form a protruding portion (FIG. 5A).

Figure 5B:
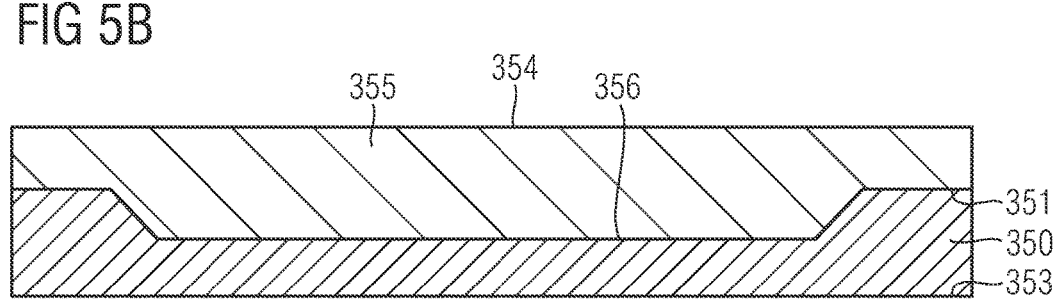

The patterned second main surface of the second substrate 355 is bonded to a carrier 350. For example, the carrier may be an insulating carrier such as a glass carrier. The carrier 350 may comprise any other transparent material such as a polymer. The second substrate 355 is bonded with a carrier 350, for example, by hot embossing. As is generally known, according to the hot embossing method, the second substrate 355 and the carrier 350 are heated to a temperature above the glass transition point. As a result, the carrier adapts its shape to the surface of the second substrate 355. As a result the bonded substrates form planar main surfaces (FIG. 5B).

Figure 5C:
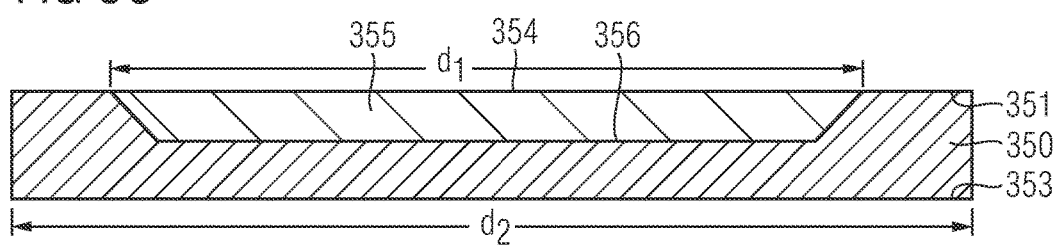
Figure 5D:
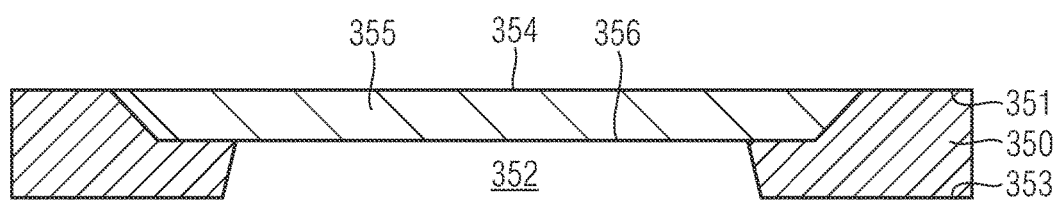

Generally, as a result of this processing sequence according to which the second substrate 355 having a protruding portion is bonded to the carrier using a hot embossing method, the second substrate 355 is embedded into the carrier 350. A resulting surface of the bonded layers includes material of the second substrate 355 as well as material of the carrier 350. Bonding the second substrate 355 to the carrier 350 using a hot embossing method results in a compact housing, since the second substrate 355 is embedded into the carrier 350. The hot embossing method is performed at an earlier processing step than filling the liquid electrolyte into the cavity, so that the high temperature applied will not affect the liquid electrolyte. Thereafter, a grinding step or a CMP (chemical mechanical polishing) step is performed so as to remove portions of the second substrate 355 that are disposed over a protruding portion of the first main surface 351 of the carrier 350. As a result, an edge portion of the first main surface 351 of the carrier 350 is uncovered (FIG. 5C). Then, a recess 352 is formed in the second main surface 353 of the carrier 350 to uncover a portion of the second main surface 356 of the second substrate 355. A cross-sectional view of the resulting structure is shown in FIG. 5D.

Figure 5E:
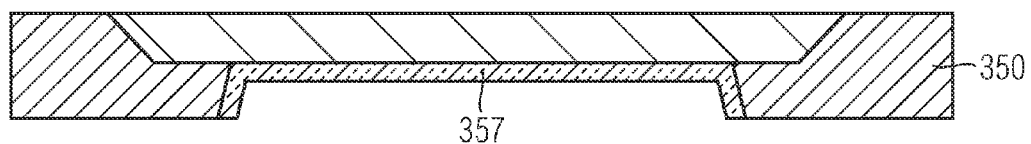

Thereafter, a protective conductive layer 357 is formed over the surface of the resulting recess 352. For example, the protective conductive layer 357 may be made of aluminium (Al). FIG. 5E shows as cross-sectional view of a resulting structure.

Then the material forming the cathode, such as NCA (NiCoAl oxide including intercalated lithium) may be filled in the recess 352. Further, a top metallization contact 358 may be formed over and in contact with the remaining portion of the second substrate 355.

An electrolyte 130 may be filled in the depression formed in the first substrate 100, followed by a separator element 135. Then, the cell filled with the electrolyte 130 may be sealed using a UV curable adhesive 160 that is disposed between the horizontal portions of the first substrate 100 and the edge portions of the carrier 350. Due to the feature that the carrier 350 is made of a transparent material, UV light may be irradiated through the edge portion of the carrier 350. As a result, a cavity is formed between the first substrate 100, the carrier 350 and the second substrate 355.

Figure 5F:
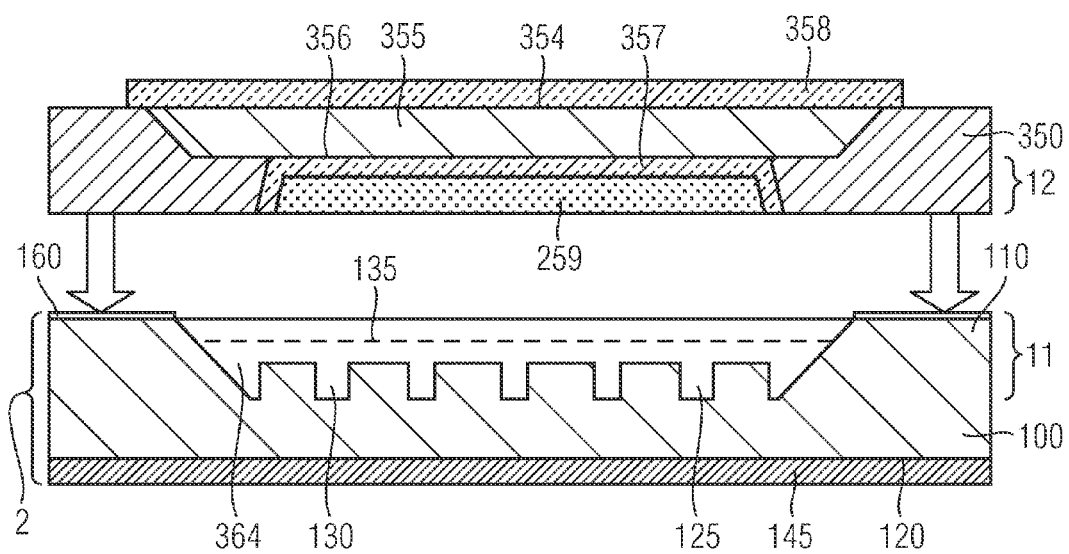

FIG. 5F shows a cross-sectional view of the substrates 100, 355 and the carrier 350 when being assembled. As is shown, the battery comprises a first substrate 100 having a first main surface 120 and a second substrate 355 made of a conducting or a semiconductor material. The battery further comprises a carrier 350 of an insulating material, having a first 351 and a second main surface 353. The second substrate 355 is attached to the first main surface 351 of the carrier and an opening is formed in the second main surface 353 of the carrier 350 to uncover a portion of the second main surface 356 of the second substrate 355. The second main surface 353 of the carrier 350 is attached to the first main surface 120 of the first substrate 100, thereby forming a cavity 364. An electrolyte 130 is disposed in the cavity 364.

Figure 6:
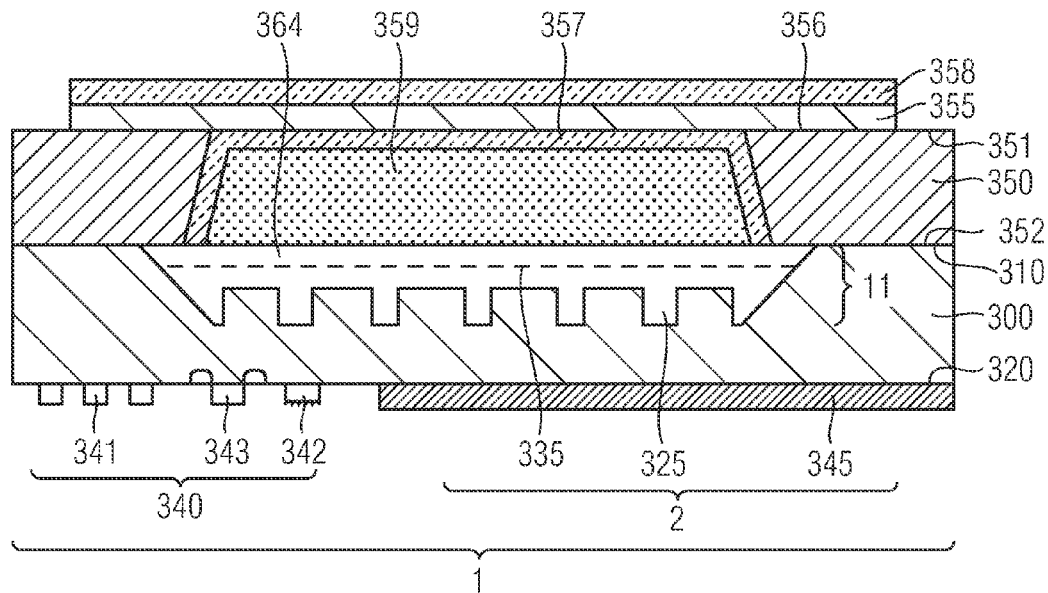
FIG. 6 shows a cross-sectional view of an integrated circuit including a battery according to a further embodiment.

FIG. 6 illustrates an integrated circuit according to a further embodiment. The lid 350 comprises an insulating material. Further, the lid 350 comprises an electrical interconnection element that provides an electrical contact from the first main surface 356 to the second main surface 353 of the carrier 350. The interconnection element comprises a second substrate 355 that is formed as a planar layer over portions of the carrier 350. The interconnection element further comprises conductive protective layer 357 disposed adjacent to the second main surface 356 of the second substrate 355 and a further conductive layer 358 that is disposed adjacent to the first main surface 354 of the second substrate 355. The integrated circuit 1 shown in FIG. 6 further comprises integrated circuit elements 340.

FIGS. 7A to 7F illustrate a method of forming the battery according to this embodiment.

Figure 7A:
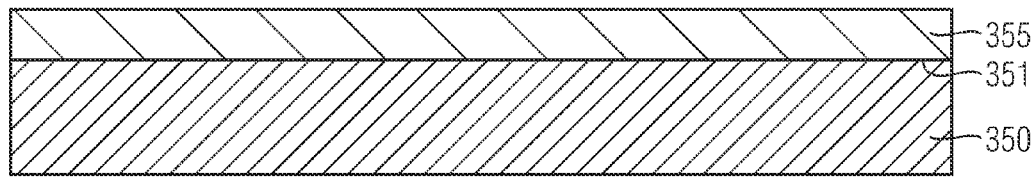

After preparing a first substrate 300 in a similar manner as has been explained with reference to FIG. 2A or 5A, a planar semiconductor wafer 355 is bonded with a carrier 350 made of an insulating material. For example, the semiconductor wafer 355 may be bonded to the carrier 350 using anodic boding or another boding method suitable for bonding planar surfaces. For example, the carrier 350 may be a glass wafer or any other wafer made of an insulating material (FIG. 7A)

Figure 7B:
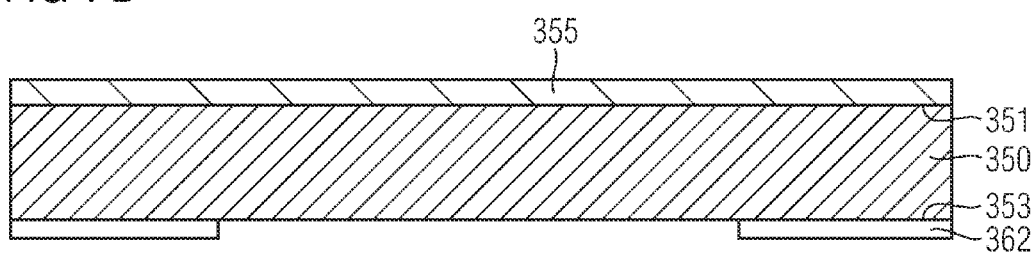

Then, a hard mask layer 362 is formed adjacent to the second main surface 353 of the carrier 350. The hard mask layer 362 is patterned to form an opening for etching an opening in the glass carrier (FIG. 7B).

Thereafter, an etching step, e.g. using HF (hydrofluoric acid) as an etchant is performed so as to define an opening or a recess 352 in the carrier 350. The recess 352 is formed so as to contact the semiconductor wafer 355 (FIG. 7C).

Thereafter, a further hard mask layer 363 is formed on the top surface 356 of the second substrate 355. The hard mask layer 363 is patterned so as to form a hard mask, thereby leaving the edge portions of the second substrate 356 uncovered. Then, an etching step of etching the second substrate is performed so as to uncover portions of the first main surface 351 of the carrier 350. Due to this patterning step, the edge portions of the combined substrates becomes transparent for UV light which enables later processing using an UV curable adhesive. FIG. 7D shows a cross-section of a resulting structure.

Thereafter, a protective conductive layer 357 such as an aluminum layer is formed on the surface of the resulting recess 352. Any material that may prevent a contact of the lithium source and the semiconductor material 355 may be used as the material of the protective conductive layer 357. Due to the presence of the protective conductive layer 357, diffusion of the lithium atoms in the semiconductor material 355 may be prevented. The cross-sectional view of a resulting structure is shown in FIG. 7E. A conductive layer 358 is formed on the top surface of the semiconductor wafer 355 so as to provide an electrical contact. Further, the lithium source 359 is filled into the cavity 364. The liquid electrolyte 330 and the separator element 335 are filled in the patterned structure 325 formed in the first main surface 310 of the first substrate 300. Thereafter, the second main surface 353 of the carrier 350 is bonded to the first main surface 310 of the first substrate 300 as indicated by the downward facing arrows in FIG. 7F. For example, this may be accomplished using an UV curable adhesive.

FIG. 8 summarizes a method of manufacturing a lithium ion battery. As is illustrated, a method of manufacturing a lithium ion battery comprises forming an electrical interconnection element (S10) in a lid comprising an insulating material, the electrical interconnection element providing an electrical connection between a first main surface and a second main surface of the lid. The method further comprises forming a cathode at the lid (S20), forming an anode at a first main surface of a first substrate (S30), the anode comprising component made of silicon, wherein forming the cathode or forming the anode comprises defining a cavity. The method further comprises filling an electrolyte into the cavity (S40), and attaching the lid to the first main surface of the first substrate (S50). As is to be clearly understood, the sequence of the processes may be changed. In particular, the cathode may be formed before forming the anode or vice versa.

According to the embodiments described above, the integrated circuit 1 comprises a battery 2 and integrated circuit elements 140, 144, 340. Components of the battery and the integrated circuit elements may be disposed on the same semiconductor substrate or semiconductor chip. According to further embodiments, the battery and elements of an electric circuit may be disposed on separate semiconductor substrates or chips. When the battery and the electric circuit are disposed on separate chips, the battery may be electrically coupled to the electric circuit via an interconnection.

Generally, within the context of the present specification, the electric circuit or the integrated circuit may comprise a processing device for processing data. The electric circuit or the integrated circuit may further comprise one or more display devices for displaying data. The electric circuit or the integrated circuit may further comprise a transmitter for transmitting data. The electric device or the integrated circuit may further comprise components which are configured to implement a specific electronic system. According to an embodiment, the electric device or the integrated circuit may further comprise an energy harvesting device that may deliver electrical energy to the battery 2, the energy having been generated from solar, thermal, kinetic, mechanical, electrochemical or other kinds of energy. For example, the electric device or the integrated circuit may be a sensor such as a tire pressure sensor, wherein the electric circuit or the integrated circuit further comprises sensor circuitry and, optionally, a transmitter that transmits sensed data to an external receiver. According to another embodiment, the electric device or the integrated circuit may be an actuator, an RFID tag or a smartcard. For example, a smartcard may additionally comprise a fingerprint sensor, which may be operated using energy delivered by the battery 2. The electric circuit or the integrated circuit may form a microelectromechanical system (MEMS) or may be a component thereof.

While embodiments of the invention have been described above, it is obvious that further embodiments may be implemented. For example, further embodiments may comprise any subcombination of features recited in the claims or any subcombination of elements described in the examples given above. Accordingly, the spirit and scope of the appended claims should not be limited to the description of the embodiments contained herein.

What is claimed is:

1. A lithium ion battery, comprising:
   a first substrate having a first main surface;
   a carrier made of an electrically insulating material attached to the first main surface of the first substrate, a cavity being defined between the first substrate and the carrier;
   an electrical interconnection element in the carrier, the electrical interconnection element providing an electrical connection between a first main surface and a second main surface of the carrier;
   an electrolyte in the cavity;
   an anode at the first main surface of the first substrate, the anode comprising a component made of a semiconductor material; and
   a cathode in direct contact with the first main surface of the carrier, the cathode being electrically connected to the electrical interconnection element.

2. The lithium ion battery according to claim 1, wherein the cavity comprises a recess in the carrier, the cathode being disposed in the recess.

3. The lithium ion battery according to claim 1, wherein the first substrate includes a patterned structure.

4. The lithium ion battery according to claim 1, wherein the electrical interconnection element comprises a via hole extending from the first main surface to the second main surface, the via hole being filled with a conductive material.

5. The lithium ion battery according to claim 1, wherein the first substrate is a semiconductor substrate and the carrier is made of glass.

6. The lithium ion battery according to claim 1, further comprising a thin film disposed over the first substrate and covering a sidewall of the carrier, the thin film sealing a connection portion between the first substrate and the carrier.

7. The lithium ion battery according to claim 1, wherein the electrical interconnection element comprises a portion of a second substrate made of a conductive or semiconductor material, the portion of the second substrate being embedded into the carrier and the portion of the second substrate being electrically connected to the cathode.

8. The lithium ion battery according to claim 1, wherein the semiconductor material is silicon.

9. An integrated circuit comprising a lithium ion battery and integrated circuit elements, the lithium ion battery including:
   a first substrate having a first main surface;
   a carrier made of an electrically insulating material attached to the first main surface of the first substrate, a cavity being defined between the first substrate and the carrier;
   an electrical interconnection element in the carrier, the electrical interconnection element providing an electrical connection between a first main surface and a second main surface of the carrier;
   an electrolyte in the cavity;
   an anode at the first main face of the first substrate, the anode comprising a component made of a semiconductor material; and
   a cathode in direct contact with the main surface of the carrier, the cathode being electrically connected to the electrical interconnection element.

10. The integrated circuit of claim 9, wherein the integrated circuit elements are formed in the first substrate.

11. The integrated circuit of claim 9, wherein the integrated circuit elements are formed in a further semiconductor substrate.

12. The integrated circuit of claim 9, wherein the integrated circuit elements are selected from the group consisting of a resistor, a capacitor, a transistor, a sensor, an energy generating device, a processing device, a display device, an actuator and a transmitter.

13. A method of manufacturing a lithium ion battery, the method comprising:
   forming an electrical interconnection element in a carrier made of an electrically insulating material, the electrical interconnection element providing an electrical connection between a first main surface and a second main surface of the carrier;
   forming a cathode in direct contact with the first main surface of the carrier, the cathode being electrically connected to the electrical interconnection element;
   forming an anode at a first main surface of a first substrate, the anode comprising a component made of a semiconductor material, wherein forming the cathode or forming the anode comprises defining a cavity;
   filling an electrolyte into the cavity; and
   attaching the carrier to the first main surface of the first substrate.

14. The method of claim 13, wherein attaching the carrier to the first main surface of the first substrate comprises forming a bonding member on the first substrate or on the carrier.

15. The method of claim 14, wherein the bonding member is made of a UV curable glue.

16. The method of claim 14, wherein the bonding member is made of a thermally curable glue.

17. The method of claim 13, wherein forming the electrical interconnection element comprises forming a via hole in the carrier and filling the via hole with a conductive material.

18. The method of claim 17, wherein the via hole is filled with a conductive material using a screen printing method, an inkjet printing method, a semiconductor embossing method or a metal embossing method.

19. The method of claim 13, further comprising forming a thin film over the first substrate and covering a sidewall of the carrier, the thin film sealing a connection portion between the first substrate and the carrier.

20. The method of claim 13, wherein forming an electrical interconnection element in the carrier comprises:
   embedding a second substrate made of a conductive or semiconductor material in the carrier, and
   defining the cavity comprises forming a recess in a first main surface of the carrier to uncover a portion of the portion of the second substrate.

* * * * *